Oct. 26, 1965 T. E. ADAMS 3,214,088
COMPRESSORS
Filed Sept. 17, 1962
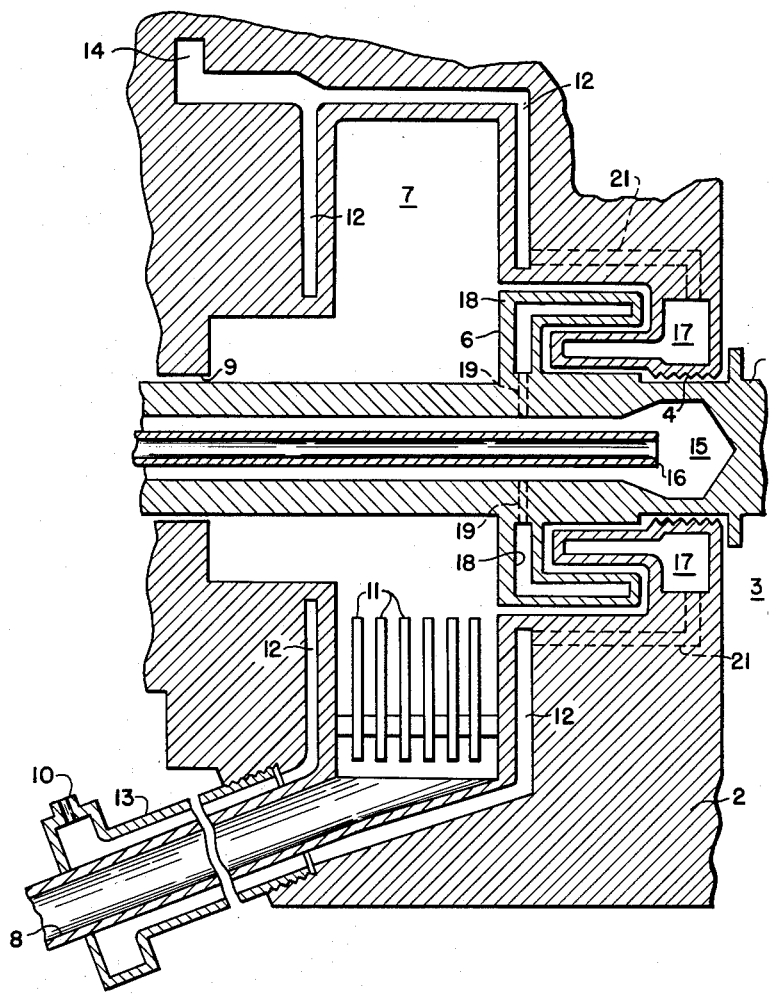
INVENTOR
THOMAS EDWARD ADAMS
BY Norris & Bateman
ATTORNEY 3,214,088
COMPRESSORS
Thomas Edward Adams, Rugby, England, assignor to Associated Electrical Industries Limited, London, England, a British company
Filed Sept. 17, 1962, Ser. No. 224,108
Claims priority, application Great Britain, Sept. 20, 1961, 33,708/61
3 Claims. (Cl. 230—207)

The present invention relates to compressors and in particularl to arrangements for preventing the contamination by oil and oil vapour of the gas being compressed.

In a compressor the impeller shaft passes through a gland in the wall of the main compressing chamber. It is undesirable to allow any oil or oil vapour to pass through this gland into the compressing chamber and in order to prevent this occurring a cavity may be provided adjacent to the gland outside the compressing chamber. Any oil which flows along the surface of the shaft towards the gland is collected in this cavity. The oil flowing towards the gland may be oil from an oil seal on another part of the shaft. The cavity is provided with a drain to remove the oil and may contain a device for indicating if the drain becomes blocked up.

However if the gas in the compressing chamber is hot, the temperature in the cavity may be high and the vapour pressure of the oil in the cavity may be increased to as much as a million times its value at normal ambient temperatures. Under these conditions a significant quantity of oil vapour may penetrate through the gland into the compressing chamber.

The object of the present invention is to provide an improved type of compressor including means for substantially preventing the flow of oil and oil vapour into the compressing chamber.

According to the present invention a compressor comprises a compressing chamber, an impeller shaft extending through a gland into said compressing chamber, and means for cooling the region adjacent to said gland so as to cool any oil in this region tending to pass through said gland into said compressing chamber.

According to a preferred embodiment the compressor comprises a cavity located outside said compressing chamber adjacent to said gland and adapted to receive oil flowing along the surface of the shaft, together with passages in the wall surrounding said cavity and means for passing a cooling fluid through said passages.

According to another embodiment the compressor comprises means for cooling the components of the gland, so as to cool the oil in the region of the gland.

The cooling fluid may be oil which is used to form a gas seal elsewhere on the shaft.

In order that the invention may be more readily understood reference will now be made to the accompanying drawing, in which the single figure is a side view, sectioned on an axial plane of part of a compressor.

The figure illustrates the part of a compressor in the region of a gland which extends around the impeller shaft where it passes into the compressing chamber. With reference to the figure, the impeller shaft 1 extends through a gland in the wall 2 of the compressing chamber. The gland comprises a fixed component 4, and a moving component 6 attached to the shaft. The gland components 4 and 6 co-operate so as to form a tortuous path for any oil and oil vapour which tends to flow into the compressing chamber 3 along the surface of the shaft.

A cavity 7 is formed in the wall of the compressing chamber. This cavity extends around the shaft 1 and is formed with a drain 8. A gas seal (not shown) on the shaft is formed with oil and oil from this seal flows along the passage 9 into the cavity 7. A plurality of plates 11 forming a capacitor are located in the bottom of the cavity 7 and indicate if the drain becomes blocked. The capacitance of the capacitor is determined by the dielectric between the plates. If the oil flows down through the drain the dielectric will be gas but if the drain becomes blocked the dielectric will be formed at least partially by oil and the capacitance will be changed. This changing capacitance corresponding to the blocking of the drain can be indicated with a suitable electrical circuit.

In order to prevent oil vapour from flowing through the gland formed by the components 4 and 6, passages 12 are formed in the wall of the cavity 7. These passages extend all around the cavity and are adapted to receive a cooling fluid. The cooling fluid is supplied through an inlet 10 in a tube 13 surrounding the drain 8, and is extracted through an outlet 14 communicating with the upper part of the passage 12. The cooling fluid is conveniently oil and it may be convenient to use the same oil that is used for the gas seal.

The cooling fluid is circulated through the passages 12 and reduces the temperature of the cavity 7 and the oil therein, and hence can be used to reduce the vapour pressure of the oil. With such an arrangement the oil vapour does not tend, to the same extent, to flow through the gland into the compressing chamber.

If the cooling fluid is circulated in the ducting at a low pressure it is essential to make the walls of the passages strong enough to withstand the pressure difference between the cooling fluid and the gas in the compressing chamber. There may be a pressure difference of between 300 and 400 pounds per square inch. It is also desirable to insulate the passages so far as is possible so as to prevent the cooling fluid being heated by conduction from the hot gas, and so as to reduce distortion of the wall in the region of the gland.

It may also be desirable to cool the gland components. To carry this out, the shaft 1 is conveniently provided with a hollow bore 15 along which extends a tube 16, and the fixed and moving gland components are formed respectively with chambers 17 and 18. The chamber 18 is connected to the bore 15 by at least one duct 19 and the chamber 17 may be connected to the passage 12 by at least one duct 21. The bore 15 and the chamber 18 are supplied with a cooling fluid along the tube 16 and the chamber 17 is supplied with either a separate supply of cooling fluid or with the cooling fluid which is circulated through the passage 12.

The provision of the chamber for cooling the gland components reduces the temperature of any oil vapours which may be present in the gland. Hence this arrangement also reduces the vapour pressure of the oil and tends to reduce the amount of oil and oil vapour passing into the compressing chamber.

It is found that cool oil absorbs more gas than hot oil. There is a small flow of gas from the compressing chamber into the cavity 7 and this gas is absorbed by the oil in the cavity. By reducing the temperature of the oil and thereby increasing the tendency of the oil to absorb the gas, the flow of gas through the gland is increased and this tends to reduce the flow of oil or oil vapour in the opposite direction through the gland to the compressing chamber.

What I claim is:
1. A compressor including:
   (a) a compressor chamber having a boundary wall;
   (b) a rotatable impeller shaft passing through an aperture in the wall;
   (c) cooperating means on the shaft and the wall at the aperture defining a gland adapted to restrict oil flow along the shaft into the compressor chamber;
(d) means in the wall adjacent the gland forming an oil collecting cavity around the shaft adapted to collect the oil flowing along the shaft before it reaches the gland;
(e) a drain for the cavity;
(f) and means for cooling the oil in the cavity to inhibit the formation of oil vapour in the cavity, comprising passages in the wall that are not open to the cavity and extend substantially around the cavity, and means for circulating cooling fluid through the passages.

2. A compressor including:
(a) a compressor chamber having a boundary wall;
(b) a rotatable impeller shaft passing through an aperture in the wall;
(c) cooperating means on the shaft and the wall at the aperture defining a gland adapted to restrict oil flow along the shaft into the compressor chamber;
(d) means for cooling the gland comprising means forming independent passages through the wall and shaft components of the gland, and means for circulating cooling fluid through the passages in the gland components;
(e) means in the wall adjacent the gland forming an oil collecting cavity around the shaft adapted to collect the oil flowing along the shaft before it reaches the gland;
(f) a drain for the cavity;
(g) and means for cooling the oil in the cavity to inhibit the formation of oil vapour in the cavity, comprising further passages in the wall that are not open to the cavity and extend substantially around the cavity, and means for circulating cooling fluid through the further passages.

3. A compressor including:
(a) a compressor chamber having a boundary wall;
(b) a rotatable impeller shaft passing through an aperture in the wall;
(c) cooperating means on the shaft and the wall at the aperture defining a gland adapted to restrict oil flow along the shaft into the compressor chamber;
(d) means for cooling the gland comprising means forming independent passages through the wall and shaft components of the gland, and means for circulating cooling fluid through the passages in the gland components;
(e) means in the wall adjacent the gland forming an oil collecting cavity around the shaft adapted to collect oil flowing along the shaft before it reaches the gland;
(f) a drain for the cavity;
(g) and means for cooling the oil in the cavity to inhibit the formation of oil vapour in the cavity, comprising further passages in the wall that are not open to the cavity and extend substantially around the cavity, and means for circulating cooling fluid through the passages, the passage in the gland wall component being open to the wall passages around the cavity whereby the same cooling fluid circulates through them both.

References Cited by the Examiner

UNITED STATES PATENTS

| | | | |
|---|---|---|---|
| 846,795 | 3/07 | Kruesi | 277—57 X |
| 2,330,730 | 9/43 | Hosshart | 277—16 |
| 2,414,788 | 1/47 | Altorfer et al. | 253—39.1 |
| 2,977,042 | 3/61 | Jassniker | 230—209 X |
| 3,013,500 | 12/61 | Bollibon | 230—209 X |
| 3,032,313 | 5/62 | Szydlowski | 230—120 X |
| 3,054,554 | 9/62 | Bluchi | 230—209 X |

LAURENCE V. EFNER, *Primary Examiner.*